US012360279B2

(12) United States Patent
Nie et al.

(10) Patent No.: US 12,360,279 B2
(45) Date of Patent: Jul. 15, 2025

(54) METHOD AND SYSTEM FOR ADVANCED DETECTION AND OPTIMIZATION OF TUNNEL RESISTIVITY BASED ON DEPTH RESOLUTION

(71) Applicants: SHANDONG UNIVERSITY, Shandong (CN); SHANDONG HI-SPEED GROUP CO., LTD., Shandong (CN)

(72) Inventors: Lichao Nie, Jinan (CN); Lei Chen, Jinan (CN); Yong Zhou, Jinan (CN); Chuan Wang, Jinan (CN); Xinji Xu, Jinan (CN); Jian Li, Jinan (CN); Zhengyu Liu, Jinan (CN); Ning Zhang, Jinan (CN); Peng Bai, Jinan (CN); Yongheng Zhang, Jinan (CN); Dongdong Xie, Jinan (CN)

(73) Assignees: SHANDONG UNIVERSITY, Shandong (CN); SHANDONG HI-SPEED GROUP CO., LTD., Shandong (CN)

( * ) Notice: Subject to any disclaimer, the term of this patent is extended or adjusted under 35 U.S.C. 154(b) by 197 days.

(21) Appl. No.: 18/031,715

(22) PCT Filed: Oct. 15, 2021

(86) PCT No.: PCT/CN2021/124212
§ 371 (c)(1),
(2) Date: Apr. 13, 2023

(87) PCT Pub. No.: WO2022/078516
PCT Pub. Date: Apr. 21, 2022

(65) Prior Publication Data
US 2023/0384473 A1    Nov. 30, 2023

(30) Foreign Application Priority Data

Oct. 15, 2020  (CN) .......................... 202011105343.6

(51) Int. Cl.
*G01V 3/38*    (2006.01)
*G01V 3/02*    (2006.01)

(52) U.S. Cl.
CPC .  *G01V 3/38* (2013.01); *G01V 3/02* (2013.01)

(58) Field of Classification Search
None
See application file for complete search history.

(56) References Cited

U.S. PATENT DOCUMENTS

| 4,321,540 A | 3/1982 | Gole et al. |
| 9,146,330 B2 * | 9/2015 | Djikpesse ................ G01V 1/28 |
| 2007/0030008 A1 * | 2/2007 | Cheung .................... G01V 3/20 |
| | | 324/367 |

FOREIGN PATENT DOCUMENTS

| CN | 103645514 A | 3/2014 |
| CN | 106772621 A | 5/2017 |

(Continued)

OTHER PUBLICATIONS

CN110908000A translation (Year: 2020).*

(Continued)

*Primary Examiner* — Lina Cordero
(74) *Attorney, Agent, or Firm* — Oliff PLC (57) ABSTRACT

A method and system for advanced detection and optimization of tunnel resistivity based on depth resolution. The method includes integrating all acquired electrode measurement data into comprehensive set, calculating its model resolution matrix, and selecting plurality of electrode measurement data from comprehensive set to form initial set; adding measurement data of electrodes that are not in initial set to initial set to form plurality of temporary subsets; calculating depth resolution balance goodness function of temporary subset according to model resolution matrix, selecting temporary subset with optimal value of depth resolution balance goodness function as new initial set, and (Continued)

determining whether average relative model resolution of initial set meets optimization requirements; if requirements are not met, continuously updating temporary subset, otherwise outputting initial set; determining number and position of tunnel face measurement electrodes according to updated initial set, and obtaining effective observation mode of advanced detection of optimized borehole resistivity.

10 Claims, 4 Drawing Sheets

(56) References Cited

FOREIGN PATENT DOCUMENTS

| CN | 108776355 A | | 11/2018 | |
| CN | 110908000 A | * | 3/2020 | ............... G01V 3/38 |
| CN | 112415602 A | | 2/2021 | |
| JP | 2001-166061 A | | 6/2001 | |

OTHER PUBLICATIONS

CN 103645514 A, IDS reference, translation (Year: 2014).*
Jan. 14, 2022 International Search Report issued in International Patent Application No. PCT/CN2021/124212.
Jan. 14, 2022 Written Opinion issued in International Patent Application No. PCT/CN2021/124212.
Zhao et al., "Research on full-relaxation signal 3D inversion of tunnel nuclear magnetic resonance", Progress in Geophysics, vol. 33, No. 2, Dec. 31, 2018, pp. 900-908.
Wang et al., "3D E-Scan resistivity inversion and optimized method in tunnel advanced prediction", Chinese Journal of Geotechnical Engineering, vol. 39, No. 2, Feb. 28, 2017, pp. 218-227.

* cited by examiner

METHOD AND SYSTEM FOR ADVANCED DETECTION AND OPTIMIZATION OF TUNNEL RESISTIVITY BASED ON DEPTH RESOLUTION

TECHNICAL FIELD

The present disclosure is in the technical field of advanced detection and observation of tunnel resistivity, specifically relates to a method and system for advanced detection and optimization of tunnel resistivity based on depth resolution.

BACKGROUND

The description in this section merely provides background information related to the present disclosure and does not necessarily constitute the prior art.

As the focus of tunnel construction gradually shifts to the mountainous area in West China with complex terrain and geology and the strait area with water barriers in East China, deep-buried tunnels and cross-river and cross-sea tunnels in the dangerous mountainous area emerge in large numbers. It is more difficult to carry out geological investigation for all kinds of deep and long tunnels with long tunnel line and large burial depth. For the long tunnels with large burial depth, because of greater crypticity and disaster due to various types of poor geological conditions, higher resolution is required, and the object is more difficult to detect, and higher requirements and challenges are posed to the advanced detection accuracy of the tunnels. At present, the traditional surface exploration conditions and technical level are difficult to meet the needs of engineering for depth and fine exploration. However, the current mainstream advanced detection methods for tunnel resistivity are difficult to identify the imaging boundary of water-bearing bodies, such as fuzzy, undetectable and inaccurate, and difficult to effectively identify some sub-meter or even decimeter water-bearing structures. Therefore, there is a need for a device for new advanced detection of tunnel resistivity, which can accurately image sub-meter water-bearing structures, i.e., a device for tunnel borehole resistivity advanced detection and observation of "electrode power supply in the bore and tunnel face array measurement".

Compared with the conventional tunnel observation mode, the device for the tunnel borehole resistivity advanced detection observation has more advantages in fine imaging: 1) further detection of depth; 2) richer and more direct information can be acquired about the anomaly around the borehole. Therefore, tunnel borehole resistivity advance detection has broad application prospects in tunnel resistivity advance detection.

However, according to the inventors, the following key problems remain to be solved in the current basic observation mode of tunnel borehole resistivity advance detection:

In order to ensure the effect of inversion imaging, a large number of electrodes need to be arranged to obtain a large number of observation data. The observation needs a large amount of time and manpower. The large number of data obtained by the basic observation mode poses a great challenge to the inversion calculation and reduces the observation efficiency.

At the same time, the current conventional optimization method is to improve the overall model resolution, which is a uniform improvement and cannot solve the problem of excessive loss of deep model resolution.

SUMMARY

In order to solve the above-mentioned problems, the present disclosure proposes a method and system for advanced detection and optimization of tunnel resistivity based on depth resolution. The present disclosure optimizes an observation system, and selects measurement electrode points which greatly contribute to the model resolution, and finally obtains an optimized electrode arrangement on the tunnel face on the basis of ensuring the model resolution, thereby simplifying the number of electrodes and improving the detection efficiency.

According to some embodiments, the following technical solution is used for the present disclosure:

A method for advanced detection and optimization of tunnel resistivity based on depth resolution, which includes:

(1) integrating all acquired electrode measurement data into a comprehensive set;

(2) calculating a model resolution matrix of the comprehensive set, and selecting a plurality of electrode measurement data from the comprehensive set to form an initial set;

(3) adding measurement data of the electrodes that are not in the initial set to the initial set to form a plurality of temporary subsets;

(4) calculating a depth resolution balance goodness function of each temporary subset according to the model resolution matrix, selecting a temporary subset with the optimal value of the depth resolution balance goodness function as a new initial set, and determining whether the average relative model resolution of the initial set at this moment meets the optimization requirements; if the requirements are not met, then returning to step (3), otherwise outputting the initial set at this moment; and (5) determining the number and position of tunnel face measurement electrodes according to the updated initial set, and obtaining the effective observation mode of advanced detection of optimized borehole resistivity.

As an alternative embodiment, in the step (1), a borehole is arranged on a tunnel face, electrodes are arranged in the borehole, and a borehole length and an electrode spacing are determined. According to the detection accuracy requirements, the size of forward and inversion grids and the number and arrangement of electrodes on the tunnel face are determined.

As an alternative embodiment, in the step (1), data acquisition is performed using a full-space tunnel borehole resistivity method.

As an alternative embodiment, in the step (2), all the potential data which can be collected by the two measurement electrodes up and down in the tunnel face are selected as an initial set.

As an alternative embodiment, in the step (4), the depth resolution balance matrix consists of resolution balance factors, and each resolution balance factor is determined according to the inversion depth.

As an alternative embodiment, in the step (4), the depth resolution balance goodness function of each temporary subset is:

$$DRB = \frac{1}{m}\sum_{j=1}^{m} \frac{H(j)M_t(j)}{M_b(j)}$$

As an alternative embodiment, in the step (4), the relative model resolution of the initial set at the moment is a ratio of the main diagonal elements of the model resolution matrix of the initial set at the moment to the main diagonal elements of the model resolution matrix of the comprehensive set.

As an alternative embodiment, in the step (4), the average relative model resolution is obtained by averaging elements in the relative model resolution.

As an alternative embodiment, in the step (4), the specific process of determining whether the average relative model resolution of the initial set at the moment meets the optimization requirements is to determine whether the value of the average relative model resolution of the initial set at the moment is greater than a set value.

A system for advanced detection and optimization of tunnel resistivity based on depth resolution including:
- a module for integrating all acquired electrode measurement data into a comprehensive set;
- a module for calculating a model resolution matrix of the comprehensive set, and selecting a plurality of electrode measurement data from the comprehensive set to form an initial set;
- a module for adding measurement data of the electrodes that are not in the initial set to the initial set to form a plurality of temporary subsets;
- a module for calculating a depth resolution balance goodness function of each temporary subset according to the model resolution matrix, selecting a temporary subset with the optimal value of the depth resolution balance goodness function as a new initial set, and determining whether the average relative model resolution of the initial set at this moment meets the optimization requirements; if the requirements are not met, returning the measurement data for re-adding additional electrodes to form a new temporary subset, otherwise outputting the module of the initial set at that time;
- a module for determining the number and position of tunnel face measurement electrodes according to the updated initial set.

A system for advanced detection and observation of tunnel resistivity including a plurality of measurement electrodes, the number and position of the measurement electrodes are determined according to the method for advanced detection and optimization of tunnel resistivity based on depth resolution.

Compared with the prior art, the beneficial effects of the present disclosure are:
1. The present disclosure discloses a method for optimizing the form of a device for tunnel resistivity advanced detection; on the basis of the basic form of the electrodes in the borehole equally spaced and uniformly arranged and the tunnel face array electrode measurement, a DRB method for depth resolution balance optimization is used for optimizing the observation device, and selecting the measurement electrode points which greatly contribute to the model resolution, and finally obtaining the optimized tunnel face electrode arrangement on the basis of ensuring the model resolution, which simplifies the number of electrodes and improves the detection efficiency.
2. According to the depth resolution balance goodness function of the present disclosure, a depth resolution balance matrix H is introduced, and the resolution balance factor of different grid model resolutions in the process of DRB calculation can be adjusted in combination with a priori information; the resolution balance of a certain depth region can be appropriately increased, so that the model resolution of this region grid is more important in the calculation of DRB, and finally the algorithm can preferentially improve the model resolution of this depth region.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

DETAILED DESCRIPTION

The present disclosure is further described below with reference to the accompanying drawings and embodiments.

It should be noted that the following detailed descriptions are all exemplary and are intended to provide a further description of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular forms "a", "an", and "the" are intended to include the plural forms as well, unless the context clearly indicates otherwise. Further, the singular form is intended to include the plural form, unless the context clearly indicates otherwise. In addition, it should further be understood that terms "comprise" and/or "include" used in this specification indicate that there are features, steps, operations, devices, components, and/or combinations thereof.

In the present disclosure, terms such as "upper", "lower", "left", "right", "front", "back", "vertical", "horizontal", "side", "bottom", and the like, designate orientations or positional relationships based on the orientation or positional relationships shown in the figures, are relational terms determined merely to facilitate recitation of structural relationships of various components or elements of the disclosure, are not intended to specifically identify any of the components or elements of the disclosure, and are not to be construed as limitations of the disclosure.

In the present disclosure, terms such as "fixedly attached", "connected with", "connected", and the like are to be construed broadly to mean either fixedly connected, integrally connected, or detachably connected; or removably connected, either directly connected, or indirectly connected through an intermediary. Relevant scientific research or technical personnel in the art may determine the specific meanings of the foregoing terms in the present disclosure according to specific situations, and such terms should not be construed as a limitation on the present disclosure.

Figure 1:
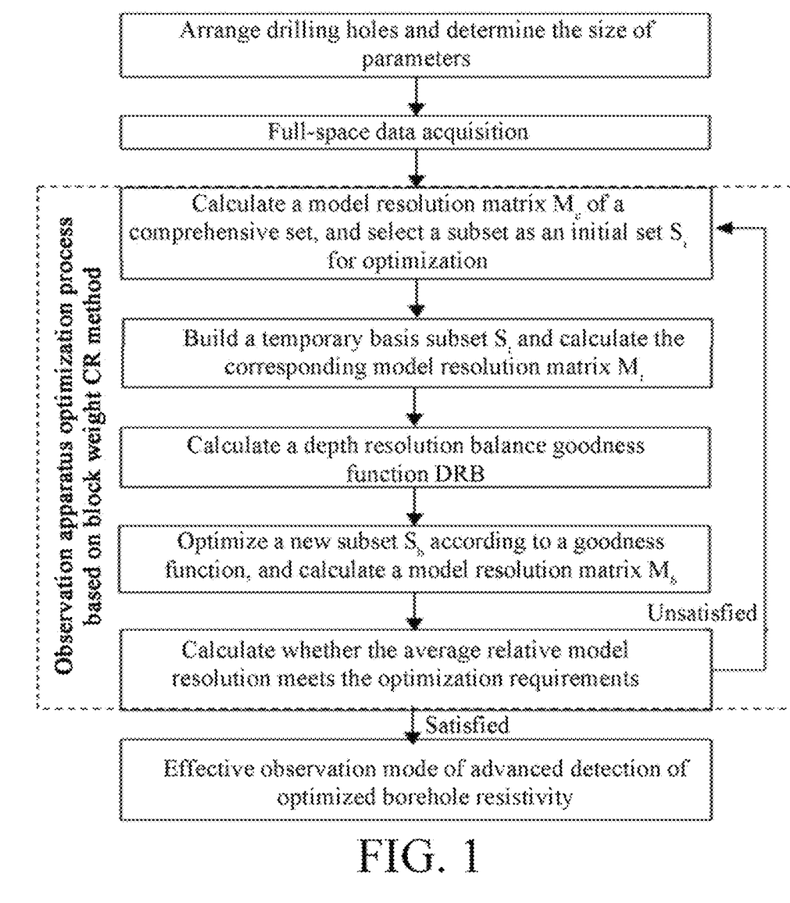
FIG. 1 is a flow chart of a depth resolution balance optimization method based on a device for advanced detection of tunnel borehole resistivity.

A method for depth resolution balance optimization of a device for tunnel resistivity advance detection, as shown in FIG. 1, the method includes:

(1) a borehole is arranged on a tunnel face, electrodes are arranged in the borehole, and a borehole length and an electrode spacing are determined; according to the detection accuracy requirements, the size of forward and inversion grids and the number and arrangement of electrodes on the tunnel face are determined;

in specific examples, it should be noted that the embodiment is merely an example, and does not merely represent that the requirements, such as the borehole depth, the number of electrodes, the spacing and the total number of data, etc. of other embodiments are consistent with the embodiment, and the above-mentioned data can all be rationally changed according to specific observation requirements and environments, which would have been readily conceivable by a person skilled in the art, and should fall within the scope of protection of the present disclosure.

Figure 2:
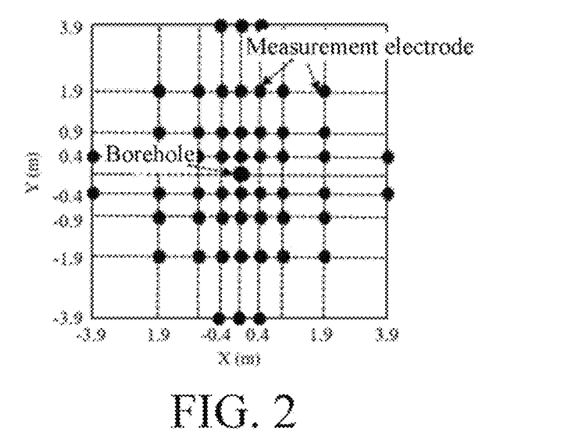
FIG. 2 is a schematic diagram of a basic mode electrode distribution of a device for borehole resistivity observation.

The maximum depth of the borehole is set to 60 m, the power supply electrodes in the borehole are arranged at equal intervals, and if the interval between the electrodes is 2 m, there are a total of 30 power supply electrodes in the borehole. The tunnel face measurement electrodes are arranged in an array, and as shown in FIG. 2, a total of 8 rows of electrodes are provided, where there are only 3 electrodes in each of the first and the eighth rows, 9 electrodes in each of the fourth and the fifth rows, and 7 electrodes in each of the remaining rows.

(2) Data acquisition is performed using a full-space tunnel borehole resistivity method;

specifically, the data acquisition is carried out by a two-pole method with power supply in borehole and reception on tunnel face, and a total of 1560 measurement data are collected.

(3) The tunnel face measurement electrodes are optimized and simplified: (1) a model resolution matrix $M_c$ of a comprehensive set is calculated, and a subset is selected as an initial set $S_i$ for optimization; (2) each other observation device is combined with the initial set to form a plurality of temporary subsets $S_t$, and a corresponding model resolution matrix $M_t$ is calculated; (3) a depth resolution balance matrix H is determined, a depth resolution balance goodness function DRB is calculated to preferentially select out the top-ranked observation devices, and the devices are added to the subset constituting the initial set to form a new subset; (4) a relative model resolution $M_r$ is calculated, an average relative model resolution is calculated, and whether the optimization requirements are met is determined; (5) if the requirements are not met, the new subset is taken as the initial set $S_i$ of optimization, returning to step (2) to continue repeating the above steps, and if the conditions are satisfied, the current subset is output as the final result of optimization.

Specifically, the basic comprehensive set $S_c$ relied on for optimization is 1560 potential data generated when 82 electrodes are all involved in power supply and measurement. For this optimization, all the potential data collected by the two measurement electrodes up and down in the tunnel face are selected as the initial set $S_i$, including 60 potential data.

A model resolution matrix M is calculated, and its linear calculation method and estimation formula are:

$$M=(G^TG+C)^{-1}G^TG$$

where, M is a model resolution matrix to be calculated, G is a Jacobian matrix and C is a constraint matrix. In the embodiment, a conventional constraint $C=\lambda I$ is used as a constraint term, where the constraint factor $\lambda$ has a value of $2.5\times10^{-6}$.

Each other measurement electrode is respectively added as an observation device into an initial set to form 80 temporary subsets $S_t$, and the corresponding model resolution matrix is calculated according to the model resolution matrix calculation formula.

Figure 5:
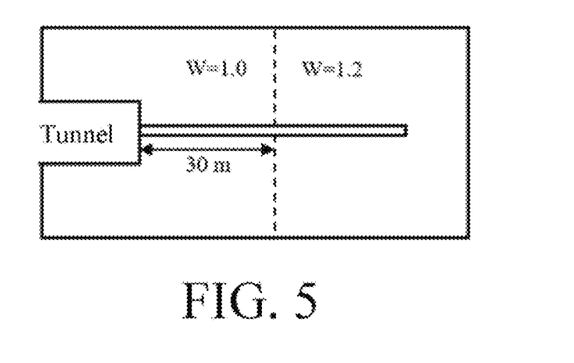
FIG. 5 is a schematic diagram of depth resolution balance factor distribution.

The depth resolution balance matrix is specifically:

$$H = \begin{cases} 1.0\sim1.1, x < h \\ 1.2\sim1.4, x \geq h \end{cases}$$

the depth resolution balance matrix H contains the resolution balance factors of all grids, and this matrix is added to adjust the resolution balance of different grid models in the process of DRB calculation. It is found from the preliminary study on model resolution distribution of a device for borehole resistivity observation that the model resolution of deep area grid will decrease with the increase of depth. In order to ensure that the deep model resolution is not excessively lost, depth resolution balance matrix is added. In the embodiment, the inversion depth is 60 m, and therefore h is taken as 30 m. When the depth is greater than 30 m, the resolution balance factor H of all grids is 1.2, while the resolution balance factor of grids within the range of 30 m in front of the tunnel takes a value of 1.0, and the specific schematic diagram is shown in FIG. 5.

All the observation devices except those in the initial set are ranked by using DRB function, and the depth resolution balance goodness function is as follows:

$$DRB = \frac{1}{m}\sum_{j=1}^{m}\frac{H(j)M_t(j)}{M_b(j)}$$

$M_t$ storing a main diagonal element of a model resolution of a temporary subset, representing a resolution vector of the temporary subset, $M_b$ storing a main diagonal element of a model resolution vector of an initial set, representing a resolution vector of the initial set, and H being a depth resolution balance matrix vector; m representing the number of elements in the above vector and $M_t(j)$ representing the $j^{th}$ element in the temporary subset resolution vector. The value of DRB function characterizes the resolution improvement of the original basic set model by the newly added observation device. In one iteration, the most ranked observation device is added into the initial set to form a new initial set. That is, a new measurement electrode point will be added to the new initial set at the end of each optimization iteration in the embodiment.

The relative model resolution of the new initial set is calculated, with the formula:

$$M_r = \frac{M_b}{M_c}$$

where $M_b$ and $M_c$ respectively store the main diagonal elements of the resolution matrices of the initial set and the comprehensive set models at the moment, which are respectively represented as an initial set resolution vector and a comprehensive set resolution vector. The division in the formula represents the division of each element in $M_b$ by the element at the corresponding position of $M_c$. The obtained results $M_r$ measure the closeness of the model resolution of the initial set and the model resolution of the comprehensive set at this moment, and the elements thereof are all numerical values between 0 and 1, and it is obvious that when these values are closer to 1, it indicates that the closer the model resolution of the initial set and the comprehensive set at this moment, the better the model resolution thereof.

The average relative model resolution of the new initial set is calculated, and whether the average relative model resolution of the new initial set meets the optimization requirements is determined, i.e., whether the average model resolution size is not less than 0.9.

Specifically, in the embodiment, when one optimization fails to meet the optimization requirements, each of the remaining observation electrodes is respectively added as an observation device to the updated initial set to constitute 79 temporary subsets, and the above steps are repeated.

Figure 3:
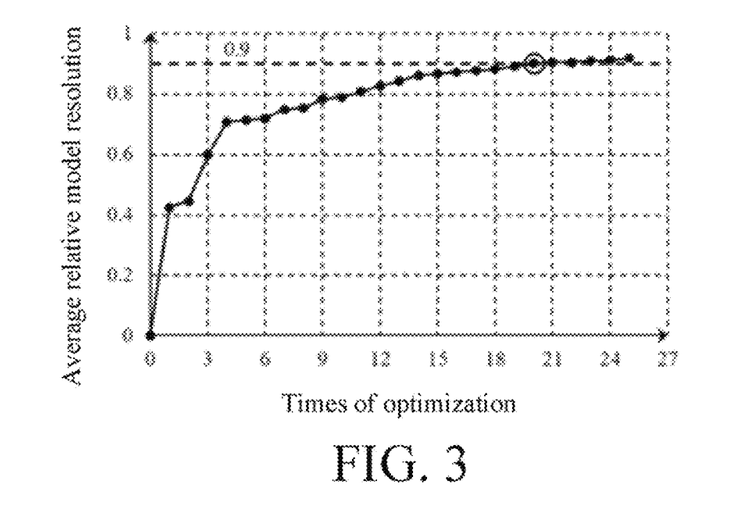
FIG. 3 is a plot of average relative model resolution as a function of number of iterations.
Figure 6:
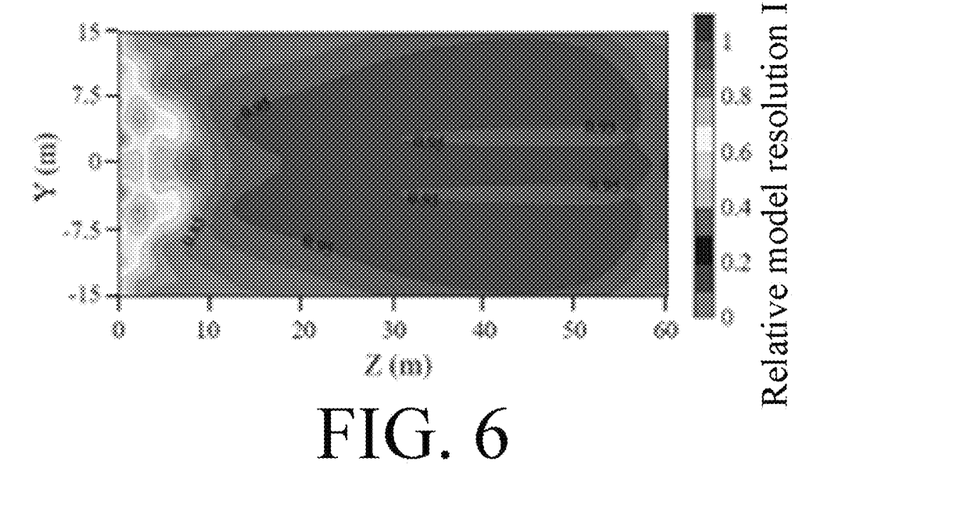
FIG. 6 is a graph of optimized relative model resolution.

Specifically, in the present embodiment, when the number of optimization iterations is 20, the average relative model resolution just meets the requirement of greater than 0.9, and the curve of the average relative model resolution with the number of optimization iterations is shown in FIG. 3. FIG. 6 is a graph of the relative model resolution distribution after 20 times of optimization, and the values of the relative model resolution of the deep parts are close to 1, indicating that the model resolution of the preferred subset is very close to that of the comprehensive set, and the model resolution of the deep part is greatly improved.

(4) The number and position of tunnel face measurement electrodes are determined according to the optimization results, and the effective observation mode of advanced detection of optimized borehole resistivity is obtained.

Figure 4:
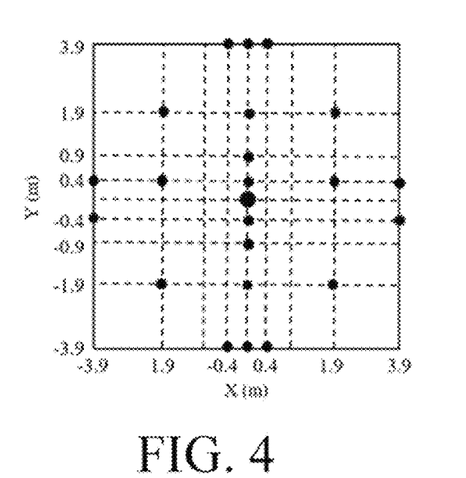
FIG. 4 is a schematic diagram of the distribution of tunnel face measurement electrodes of the optimized observation device.

The optimized tunnel face electrode positions and numbers were obtained as shown in FIG. 4. The figure shows that compared with the measurement electrodes on the tunnel face before optimization, the optimized measurement electrodes on the tunnel face are removed more redundant electrodes, the middle vertical column of measurement electrodes are all selected, and the remaining selected electrodes are more symmetrically distributed around the edge, a total of 22 measurement electrodes are included on the tunnel face, such an arrangement of measurement electrodes can more evenly improve the overall model resolution, and combined with 30 power supply electrodes in the borehole, a total of 660 potential data, less than half of the data of the comprehensive set can be collected, greatly improving the observation efficiency and improving the engineering applicability.

Figure 7:
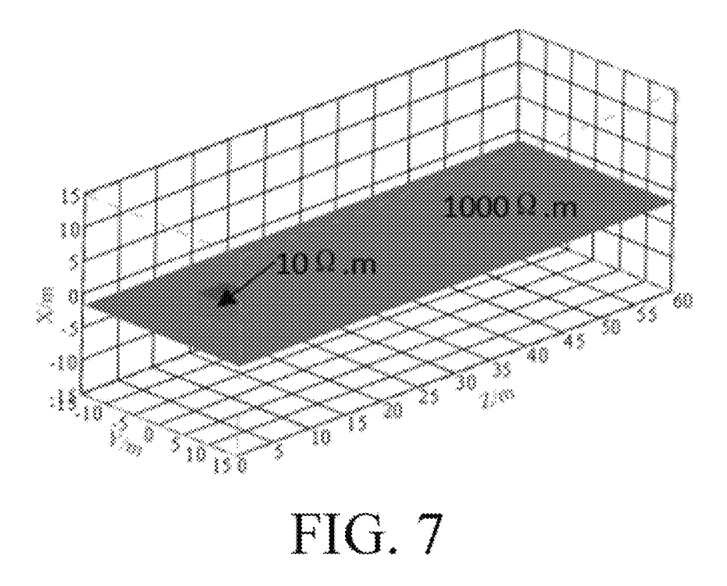
FIG. 7 is a diagram of a geoelectric model used in numerical simulation.
Figure 8:
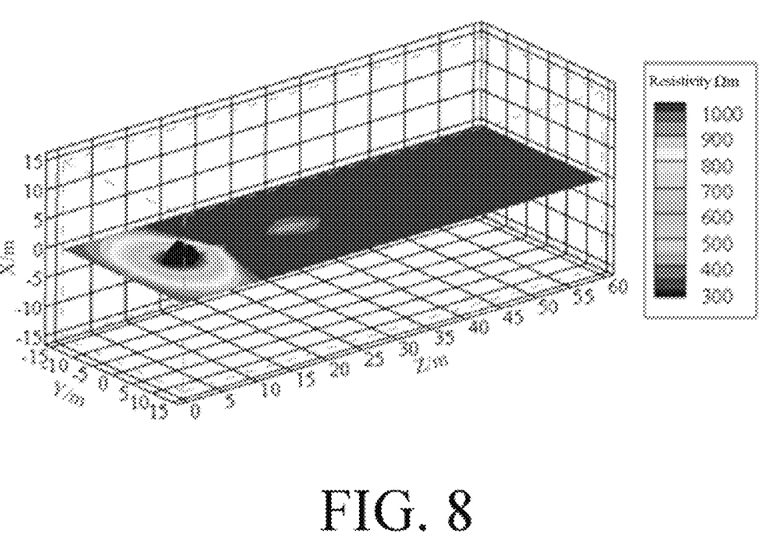
FIG. 8 is a diagram of an inversion result based on a device for optimized tunnel borehole observation model device.

FIG. 7 is an earth-electricity model for inversion calculation, the inversion area is 30 m*30 m*60 m, the background resistivity is set to 1000 Ω·m, where a low-resistance abnormal body with a size of 4 m*5 m*6 m and a resistivity of 10 Ω·m is set. The inversion results are shown in FIG. 8. The numerical simulation results show that the depth resolution balance optimization method for the tunnel borehole resistivity advanced detection device simplifies the number of electrodes, reduces the amount of data and improves the inversion efficiency, while still ensuring the effect of inversion imaging.

The foregoing descriptions are merely exemplary embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. A method for advanced detection and optimization of tunnel resistivity based on depth resolution; comprising:
   (1) integrating all acquired electrode measurement data into a comprehensive set;
   (2) calculating a model resolution matrix of the comprehensive set, and selecting a plurality of electrode measurement data from the comprehensive set to form an initial set;
   (3) adding measurement data of the comprehensive set that are not in the initial set to the initial set to form a plurality of temporary subsets;
   (4) calculating a depth resolution balance goodness function of each temporary subset according to the model resolution matrix, selecting a temporary subset with a value of the depth resolution balance goodness function as a new initial set, and determining whether an average relative model resolution of the initial set at a corresponding moment meets optimization requirements; if the optimization requirements are not met, then returning to the step (3), otherwise outputting the initial set at the corresponding moment; and
   (5) determining a number and position of tunnel face measurement electrodes according to an updated initial set, and obtaining effective observation mode of advanced detection of optimized borehole resistivity.

2. The method for advanced detection and optimization of tunnel resistivity based on depth resolution according to claim 1, wherein in the step (1), a borehole is arranged on a tunnel face, electrodes are arranged in the borehole, and a borehole length and an electrode spacing are determined; according to detection accuracy requirements, a size of forward and inversion grids and a number and arrangement of electrodes on the tunnel face are determined.

3. The method for advanced detection and optimization of tunnel resistivity based on depth resolution according to claim 1, wherein in the step (1), data acquisition is performed using a full-space tunnel borehole resistivity method.

4. The method for advanced detection and optimization of tunnel resistivity based on depth resolution according to claim 1, wherein in the step (2), all potential data which can be collected by two measurement electrodes up and down in a tunnel face is selected as the initial set.

5. The method for advanced detection and optimization of tunnel resistivity based on depth resolution according to claim 1, wherein in the step (4), the depth resolution balance goodness function includes resolution balance factors, and each resolution balance factor is determined according to an inversion depth.

6. The method for advanced detection and optimization of tunnel resistivity based on depth resolution according to claim 1, wherein in the step (4), the depth resolution balance (DRB) goodness function of each temporary subset is:

$$DRB = \frac{1}{m}\sum_{j=1}^{m}\frac{H(j)M_t(j)}{M_b(j)}$$

wherein, $M_t$ stores a main diagonal element of a model resolution vector of the temporary subset, representing a resolution vector of the temporary subset, $M_b$ stores a main diagonal element of a model resolution vector of the initial set, representing a resolution vector of the initial set, H represents a depth resolution balance matrix vector; m represents a number of elements in each vector and $M_t(j)$ represents a $j^{th}$ element in the resolution vector of the temporary subset.

7. The method for advanced detection and optimization of tunnel resistivity based on depth resolution according to claim 1, wherein in the step (4), the average model resolution of the initial set at the corresponding moment is a ratio of main diagonal elements of the model resolution matrix of the initial set at the corresponding moment to main diagonal elements of the model resolution matrix of the comprehensive set.

8. The method for advanced detection and optimization of tunnel resistivity based on depth resolution according to claim 1, wherein in the step (4), the average relative model resolution is obtained by averaging elements in a relative model resolution.

9. The method for advanced detection and optimization of tunnel resistivity based on depth resolution according to claim 1, wherein in the step (4), a specific process of determining whether the average relative model resolution of the initial set at the corresponding moment meets the optimization requirements is to determine whether a value of the average relative model resolution of the initial set at the corresponding moment is greater than a set value.

10. A system for tunnel resistivity advanced detection and observation, comprising a plurality of measurement electrodes, a number and position of the plurality of measurement electrodes being determined according to the method for advanced detection and optimization of tunnel resistivity based on depth resolution according to claim 1.

* * * * *